3,028,450
GAS LEAK DETECTION APPARATUS
Dennis J. Manning, 1425 Deer Path, Mountainside, N.J.
Filed Jan. 20, 1959, Ser. No. 787,845
1 Claim. (Cl. 179—1)

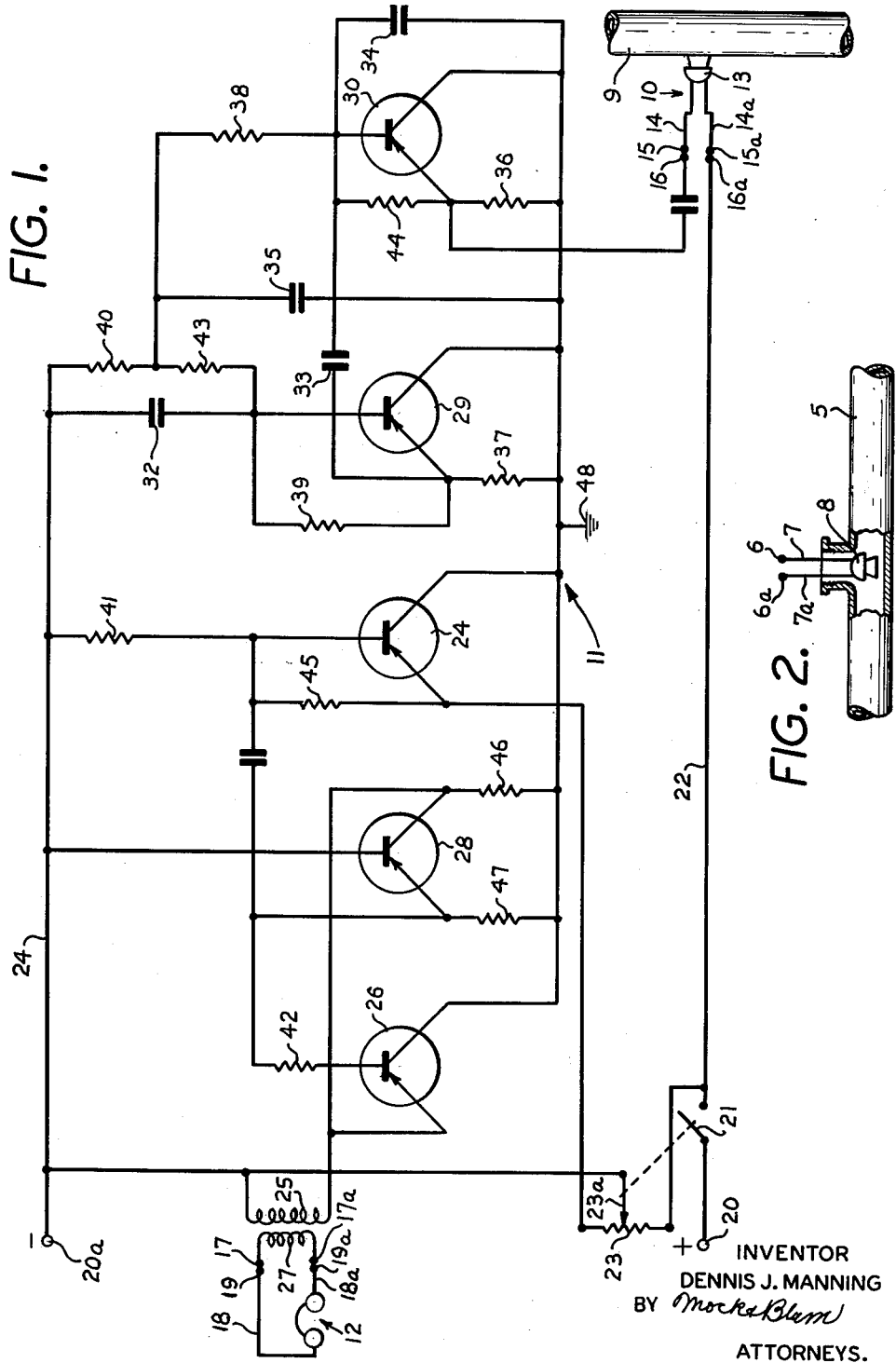

This invention relates to an improved leak detector for gas pipelines and, in particular, relates to an improved detector which is responsive to variation in the intensity of sound of flowing gas resulting from the presence of leaks in the pipeline.

A leak detector of this general type is shown in U.S. patent to Smith, No. 2,008,934, issued July 23, 1935. However, the apparatus of this patent is unsatisfactory because it results in considerable damping of the sound vibrations of the gas in the pipeline, and because it does not provide any means of distinguishing the sound of the flowing gas from background noises.

I have discovered that gas flowing in a pipeline under a wide range of pressure emits sound having a frequency which is at least partially within the range of 500 to 8000 cycles per second. On the other hand, the background noise which is present has a frequency range substantially outside said range of 500 to 8000 cycles per second. In accordance with my invention, I provide apparatus having a highly sensitive probe microphone which may be placed against the pipeline or inside the pipeline without materially damping the sound of the gas flow. This probe microphone may be connected to a sensitive amplifier having a frequency range of 500 to 8000 cycles, the output of which is connected to earphones or the like, so that the operator may actually hear the sound emitted by the gas in the pipeline at the point at which the probe is located.

In accordance with my invention, background noises are excluded, to the extent that leaks can be detected by observing a greater volume of sound than is present in a leak-free system. Since the volume of the sound is greatest at the point of the leak, it will be apparent that by placing the probe at different points of the pipeline, it is possible to locate the exact position of the leak with considerable accuracy.

Other objects and advantages of my invention will become apparent from the following description in conjunction with the annexed drawing, in which preferred embodiments of the invention are disclosed.

In the drawing, FIG. 1 is a schematic diagram of the invention, showing the probe microphone applied to the outside of a gas pipeline.

FIG. 2 is a fragmentary detail view showing a probe inserted inside a gas pipeline.

The three essential elements of my invention comprise a probe 10 which serves as a sound receiver and transducer to convert the sound energy to electrical energy, an electrical amplifier 11, and an output device 12 which is a transducer of the energy of the amplifier 11 into sound or some other measurable quantity.

The receiving device 10 consists of a small probe housing 13 which contains a highly sensitive microphone (not shown). This microphone is optionally a sensitive crystal pickup microphone. The microphone has output leads 14 and 14a which connect to terminals 15 and 15a, which may be the terminals of a jack. Amplifier 11 has input terminals 16 and 16a, which may be the terminals of a jack socket. This arrangement permits amplifier 11 to be located at a point remote from the gas pipeline. Amplifier 11 has output terminals 17 and 17a which may be the terminals of a jack socket.

Output device 12 is shown diagrammatically as a pair of earphones, having input leads 18 and 18a. These leads 18 and 18a connect to terminals 19 and 19a which may be the terminals of a jack. This enables the output device 12 to be located at a point remote from amplifier 11, if desired. This also permits interchangeability of output devices 12.

It will be apparent that by the use of jacks, it is possible to connect different probes 13 to the input of amplifier 11, and different output devices 12 to the output of amplifier 11.

While output device 12 is shown as earphones, it will be apparent that a loudspeaker or a current meter may be employed, either separately or in conjunction with earphones 12, in a manner well known in the art.

FIG. 1 shows probe 13 as an external probe which is adapted to be placed against the outside of a gas pipeline 9. In certain instances, an internal probe may be preferred.

FIG. 2 shows a probe 8, containing a microphone and having leads 7 and 7a which connect to terminals 6 and 6a. It will be apparent that these terminals 6 and 6a may be connected to terminals 16 and 16a if the use of an internal probe is preferable. Said probe 8 is shown located inside pipeline 5. While the showing is diagrammatic, it will be understood that the internal pickup microphone of FIG. 2 is sufficiently small so as not to produce a substantial overall damping effect upon the sound emitted by the gas in pipeline 5.

Any suitable amplifier 11 may be employed. However, as a particular feature of my invention, said amplifier 11 preferably is most sensitive to a frequency range of substantially 500 to 8000 cycles per second. By way of illustration, one particular amplifier 11 is shown diagrammatically in the drawing. Said amplifier 11 has power terminals 20 and 20a which are respectively adapted to be connected to the positive and negative terminals of a source of direct current (not shown). Terminals 20 connects through manual on-off switch 21 and line 22 to terminal 16a.

One fixed terminal of potentiometer 23 is connected to line 22. The movable contact arm 23a of potentiometer 23 is connected to line 24, which is in turn connected to terminal 20a. Contact arm 23a and switch 21 are indicated in the drawing as being ganged. The other fixed terminal of potentiometer 23 is connected to the output of transistor 24.

The output transformer of the amplifier has a primary 25, one terminal of which is connected to potentiometer arm 23a, and the other terminal of which is connected to the output of transistor 26. The transformer secondary 27 is connected to the respective terminals 17 and 17a.

The output of transistor 26 connects through transformer primary 25 and variable resistance 23 to ground. The amplified signal of probe 13 is applied across the entire winding of potentiometer 23. A signal in the pickup causes an unbalance of the circuits, resulting in a voltage across transformer primary 25 and a resulting audible signal in microphone 12.

Since the electrical circuit is clear from the drawing, it will not be described in detail.

Transistors 24 and 26, together with the remaining transistors 28, 29 and 30, are all preferably transistors of the type known as Germanium P-N-P. Preferably, each of the transistors has a frequency range of substantially 500 to 9000 cycles per second, and are associated with a filter network, as shown, being most sensitive to a frequency range of substantially 500 to 8000 cycles per second.

In a working model, the condensers 31, 32, 33 and 34 each had a capacity of 0.1 microfarad. Condenser 35 had a capacity of 10 microfarads. The resistors 36, 37 and 38 each had a resistance of 10,000 ohms. The resistance of resistors 39 and 45 was, in each instance, 100,000 ohms. The resistance of resistors 40, 41, 42 and 43 was, in each instance, 2200 ohms. The resistance of resistor 44 was 120,000 ohms. Resistor 46 had a resistance of 270 ohms. Resistor 47 had a resistance of 5600 ohms.

The common ground of the circuit is designated by the reference numeral "48."

Tests have shown that if the amplifier is responsive to frequencies substantially greater than 8000 cycles per second, or substantially less than 500 cycles per second, background noises are received and amplified, and the volume of the output sound does not vary in proportion to the distance of the probe from a source of a leak in the pipeline. However, I have found that in the case of gas transmission pipelines, particularly those of the type used in the final stages of transmission of gas to homes, the characteristic frequencies of background noises which may be picked up by the probe are substantially outside the frequency range of substantially 500 to 8000 cycles per second. On the other hand, a substantial proportion of the characteristic frequencies of the sounds emitted by gas flowing in a pipeline, and responsive in volume to the presence or absence of leaks, are located in the frequency range of substantially 500 to substantially 8000 cycles per second.

Accordingly, the output of my device is substantially proportional to that portion of the volume of sound emitted by the flowing gas in a gas pipeline which is, in turn, proportional to the distance from the probe to a source of gas leakage from the pipeline.

The range of pressures of the gas within the pipeline is not critical. For any reasonable given pressure within a pipeline, and for a given setting of potentiometer arm 23a, it is possible to determine the volume of sound in a gas pipeline of specified diameter, which would exist in the absence of leaks. When the probe is applied to the gas pipeline in the field, it is possible to determine by the volume of sound whether one or more leaks in fact exist. Furthermore, by moving the probe along the pipeline in the direction of increasing sound, it is possible to locate the leak with considerable accuracy.

While I have disclosed a preferred embodiment of my invention and have indicated various changes, omissions and additions which may be made therein, it will be apparent that various other changes, omissions and additions may be made in the invention without departing from the scope and spirit thereof.

I claim:

Apparatus for use in detecting leakage from gas pipelines, comprising a microphone adapted to be placed within the gas stream of the pipeline, said microphone being sized so as to exert substantially no damping effect upon the sound vibrations emitted by said gas, an amplifier coupled to the output of said microphone and having a most effective operating frequency range of substantially 500 to substantially 8000 cycles per second, and an output transducer coupled to the output of said amplifier.

References Cited in the file of this patent

UNITED STATES PATENTS

| | | |
|---|---|---|
| 1,715,831 | Hahnemann | June 4, 1929 |
| 1,777,118 | Harrison | Sept. 30, 1930 |
| 2,008,934 | Smith | July 23, 1935 |
| 2,499,806 | Wouk et al. | Mar. 7, 1950 |
| 2,884,624 | En Dean et al. | Apr. 28, 1959 |